(12) United States Patent
Paschen (10) Patent No.: US 9,091,316 B2
(45) Date of Patent: Jul. 28, 2015

(54) DAMPERS FOR CRANKSHAFTS OF RECIPROCATING ENGINES AND RECIPROCATING ENGINES COMPRISING THE SAME

(71) Applicant: TRD U.S.A., Inc., Torrance, CA (US)

(72) Inventor: Heinz Paschen, Laguna Beach, CA (US)

(73) Assignee: TRD U.S.A., Inc., Torrance, CA (US)

( * ) Notice: Subject to any disclaimer, the term of this patent is extended or adjusted under 35 U.S.C. 154(b) by 77 days.

(21) Appl. No.: 13/798,265

(22) Filed: Mar. 13, 2013

(65) Prior Publication Data

US 2014/0260782 A1  Sep. 18, 2014

(51) Int. Cl.
*F16C 3/04* (2006.01)
*F16F 7/108* (2006.01)

(52) U.S. Cl.
CPC ............. *F16F 7/108* (2013.01); *Y10T 74/2131* (2015.01)

(58) Field of Classification Search
USPC ................... 74/603, 604; 464/180; 123/192.2
See application file for complete search history.

(56) References Cited

U.S. PATENT DOCUMENTS

| 2,764,003 | A | * | 9/1956 | Croset .............................. 464/74 |
| 5,425,287 | A | | 6/1995 | Beattie |
| 5,931,052 | A | | 8/1999 | Zhao et al. |
| 6,024,615 | A | | 2/2000 | Eichinger |
| 6,045,448 | A | * | 4/2000 | Kern et al. ....................... 464/74 |
| 6,161,512 | A | | 12/2000 | Beels Van Heemstede |
| 6,875,113 | B2 | | 4/2005 | Nichols |
| 6,993,989 | B2 | * | 2/2006 | Oomura et al. .................. 74/7 E |
| 7,625,290 | B2 | * | 12/2009 | Hodjat et al. .................... 464/75 |
| 8,015,897 | B2 | | 9/2011 | Fisher |
| 2005/0192103 | A1 | * | 9/2005 | Hauck .............................. 464/75 |

OTHER PUBLICATIONS

J.C. Beattie of ATI Performance Products, Crankshaft Vibration Dampers 101, http://www.atiracing.com/products/dampers/101/index.htm; visited on Oct. 25, 2012.

* cited by examiner

*Primary Examiner* — Vicky Johnson
(74) *Attorney, Agent, or Firm* — Dinsmore & Shohl LLP (57) ABSTRACT

A damper for a crankshaft of a reciprocating engine includes an inner shell and an inertia ring, the inner shell and the inertia ring having a plurality of teeth and grooves that are intermeshed with one another. The damper further includes a plurality of damping pads positioned between the teeth of the inner shell and the grooves of the inertia ring. The inertia ring is constrained from translating in the axial direction and the radial direction with respect to the inner shell and is rotatable with respect to the inner shell in the circumferential direction through a constrained range by compressing the damping pads.

20 Claims, 8 Drawing Sheets

DAMPERS FOR CRANKSHAFTS OF RECIPROCATING ENGINES AND RECIPROCATING ENGINES COMPRISING THE SAME

TECHNICAL FIELD

The present specification generally relates to dampers for crankshafts and, more specifically, to dampers having limited circumferential movement between an inertia ring and an inner shell coupled to the crankshaft.

BACKGROUND

In internal combustion engines, the engine crankshaft translates power generated in the combustion and expansion strokes of the engine cylinders and converts the power to torque. The torque output from the engine is delivered from the crankshaft through a torque transmission device to provide motive force. For example, in a motor vehicle, the crankshaft provides torque to the drivetrain of the vehicle; in a marine vehicle, the crankshaft provides torque to a propulsion system; in a power generation device, the crankshaft provides torque to a rotor that rotates within a stator.

Throughout operation of the engine, the torque applied to the crankshaft varies due to, for example, periodic firing of the engine's cylinders, variation in the crankshaft rotational speed, and engagement and disengagement of transmission elements. These torque variations may create torsional vibrations in the crankshaft that may tend to periodically twist the crankshaft. Twisting of the crankshaft by the torque variations may increase vibrations that are imparted to the transmission elements, which may increase bearing wear, as well as adversely affect engine timing caused by variations in the piston position relative to the end of the crankshaft. Further, twisting of the crankshaft may increase mechanical stress in the crankshaft itself, which may lead to failure of the crankshaft.

Accordingly, dampers for crankshafts of reciprocating engines may be desired to mitigate torsional vibrations in the crankshafts.

SUMMARY

In one embodiment, a damper for a crankshaft includes an inner shell having a body portion, a cover flange extending in a circumferential direction around an end face of the body portion, and a plurality of teeth extending in a radial direction from the body portion. The damper also includes an inertia ring having a plurality of grooves extending in the radial direction, the inertia ring positioned proximate to the inner shell such that grooves of the inertia ring intermesh the teeth of the inner shell. The inertia ring further includes a plurality of damping pads positioned between the teeth of the inner shell and the grooves of the inertia ring. The inertia ring is constrained from translating in the axial direction and the radial direction with respect to the inner shell and is rotatable with respect to the inner shell in the circumferential direction through a constrained range by compressing the damping pads.

In another embodiment, a damper for a crankshaft includes an inner shell having a body portion, a cover flange extending in a circumferential direction around an end face of the body portion, and a plurality of teeth extending in a radial direction from the body portion. The damper also includes an inertia ring comprising a plurality of grooves extending in the radial direction, where the inertia ring is positioned proximate to the inner shell such that grooves of the inertia ring intermesh the teeth of the inner shell. The damper further includes a plurality of damping pads positioned between the teeth of the inner shell and the grooves of the inertia ring and an outer shell extending around at least a portion of the inertia ring in the circumferential direction. The inertia ring is constrained from translating in the axial direction and the radial direction with respect to the inner shell and is rotatable with respect to the inner shell in the circumferential direction through a constrained range by compressing the damping pads.

In yet another embodiment, a reciprocating engine includes a crankshaft assembly having a plurality of pistons adapted to reciprocate in a radial direction, a crankshaft adapted to rotate in a circumferential direction, a plurality of connecting rods coupling one of the plurality of pistons to the crankshaft, and a damper coupled to the crankshaft. The damper includes an inner shell having a body portion, a cover flange extending in the circumferential direction around an end face of the body portion, and a plurality of teeth extending in the radial direction from the body portion. The damper also includes an inertia ring having a plurality of grooves extending in the radial direction, where the inertia ring is positioned proximate to the inner shell such that grooves of the inertia ring intermesh the teeth of the inner shell. The damper further includes a plurality of damping pads positioned between the teeth of the inner shell and the grooves of the inertia ring and an outer shell extending around at least a portion of the inertia ring in the circumferential direction. The inertia ring is constrained from translating in the axial direction and the radial direction with respect to the inner shell and is rotatable with respect to the inner shell in the circumferential direction through a constrained range by compressing the damping pads.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Dampers according to the present disclosure generally include an inner shell, an inertia ring, and a plurality of damping pads. The inner shell has a plurality of teeth extending in a radial direction from a body portion. The inertia ring has a corresponding number of grooves that extend in the radial direction. The grooves of the inertia ring intermesh with the teeth of the inner shell and the damping pads are positioned between the teeth and the grooves. The inertia ring is constrained from moving in the radial and axial directions while being rotatable relative to the inner shell in the circumferential direction through a constrained range. The damping pads are compressible and allow the inertia ring to be rotate relative to the inner shell. The damping pads also absorb vibration introduced to the damper through the inner shell. Various embodiments of the dampers and reciprocating engines incorporating the dampers will be described in more detail herein.

Figure 1:
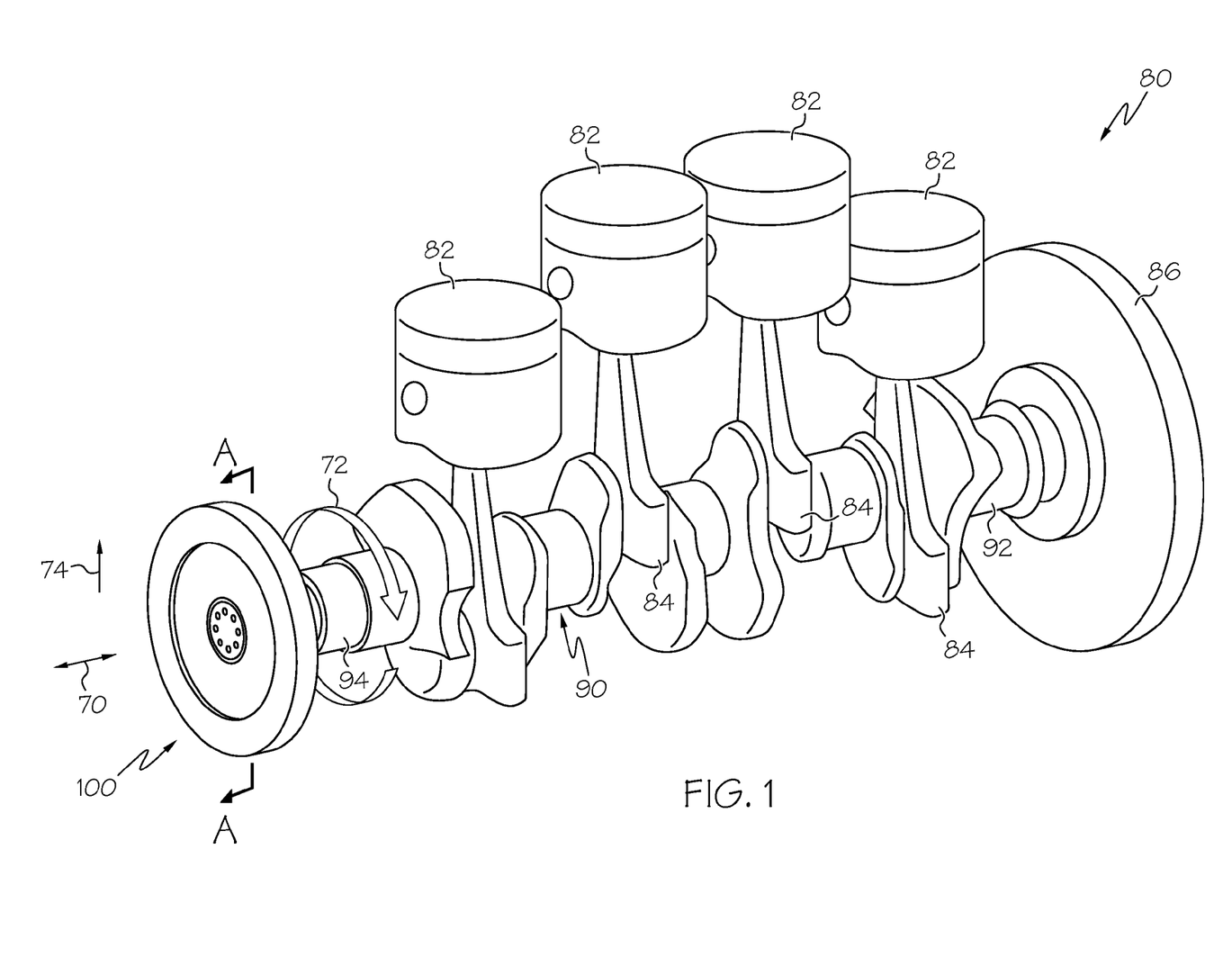
FIG. 1 schematically depicts a side perspective view of a crankshaft assembly of an internal combustion engine according to one or more embodiments shown or described herein.

FIG. 1 generally depicts a crankshaft assembly for an internal combustion engine, including a crankshaft and a plurality of pistons coupled to the crankshaft through connecting rods. The crankshaft assembly is mounted in an engine block (not shown), and may be incorporated into a variety of vehicles or equipment including, for example and without limitation, motor vehicles, airplanes, marine vehicles, rail vehicles, power generation equipment, and the like. The crankshaft assembly includes a transmission element coupled to a first end of the crankshaft and a damper coupled to a second end of the crankshaft. Power generated by the pistons is captured by the crankshaft, which directs torque through the transmission element. The power generated by the pistons may vary due to quantity of fuel combusted in the combustion chambers, the periodic firing of the engine cylinders, variation in crankshaft rotational speed, and engagement and disengagement of transmission elements, which may induce twisting or vibrations into the crankshaft. The damper absorbs and dissipates the twisting and/or vibrations from the crankshaft, such that mechanical stresses in the crankshaft are reduced. Further, the damper according to embodiments described herein is resistant to wear, such that operation of the damper may be maintained at elevated crankshaft rotational speeds and at high crankshaft acceleration rates for extended durations.

As used herein, axial direction 70, circumferential direction 72, and radial direction 74 refer to directions oriented with respect to orientation of rotation of the crankshaft 92. During engine operation, the crankshaft 92 rotates about a longitudinal axis, which is used herein to define the axial direction 70. The direction of rotation of the crankshaft 92 also defines the circumferential direction 72 (the direction around the axial direction 70), and the radial direction 74 (the direction perpendicular to the axial direction 70).

Referring to FIG. 1 in detail, the reciprocating engine 80 includes a plurality of pistons 82 that are adapted to reciprocate within cylinders of an engine block (not shown), as is conventionally known. The pistons 82 are coupled to a crankshaft 92 through connecting rods 84 to form a crankshaft assembly 90. The crankshaft 92 includes a plurality of offset lobes, to which the connecting rods 84 are attached. The crankshaft assembly 90 also includes a transmission device 86 coupled to the crankshaft 92 and a damper 100 coupled to the crankshaft 92. As depicted in FIG. 1, the crankshaft assembly 90 may also include a timing drive 94 coupled to the crankshaft 92. The timing drive 94 may be coupled to various components of the reciprocating engine 80 that rotate at a speed relative to the crankshaft 92. For example, the cam shafts of the reciprocating engine that are responsible for actuating the valvetrain of the reciprocating engine 80 may be coupled to the timing drive 94. The transmission device 86 is positioned proximate to a first end of the crankshaft 92, and may be positioned along a portion of the crankshaft 92 that extends outside of the engine block (not shown). The transmission device 86 transmits torque from the crankshaft 92, and therefore the reciprocating engine 80, to provide motive force. Such transmission devices 86 may include, for example and without limitation, a flywheel, a torque converter, a clutch element, and the like. In the embodiment depicted in FIG. 1, the damper 100 is positioned proximate to a second end of the crankshaft 92 opposite the first end, and may be positioned along a portion of the crankshaft 92 that extends outside of the engine block (not shown).

The top surface of each of the pistons 82, along with the cylinders and cylinder heads (not shown), define a plurality of combustion chambers, in which an air-fuel mixture is introduced, compressed, ignited, expanded, and exhausted. After the air-fuel mixture is ignited, pressure inside the combustion chamber rises, pushing the piston 82 towards the crankshaft assembly 90. As the pistons 82 translate towards the crankshaft assembly 90, the connecting rods 84 transfer force from the increased pressure to the crankshaft assembly 90, thereby providing the crankshaft assembly 90 with torque.

Transfer of force from each of the pistons 82 is not uniform within a single rotation of the crankshaft 92, however, as the pistons 82 within the reciprocating engine 80 only apply force to the crankshaft 92 in the expansion stroke of the reciprocating engine 80. Further, multiple pistons 82 are coupled to the crankshaft 92 in the axial direction 70. The air-fuel mixture in each of the combustion chambers defined by the pistons 82 are periodically ignited in the ignition stroke, in a so-called firing pattern. Because the ignition and expansion strokes deliver force to the crankshaft 92 according to the firing pattern, force applied to the crankshaft 92 is periodic and alternating in the axial direction 70 at any given point in the operating cycle of the reciprocating engine 80. Further, as the reciprocating engine 80 is operated, some of the pistons 82 translate towards the crankshaft 92 in the expansion stroke and/or the intake stroke, while other pistons 82 translate away from the crankshaft 92 in the exhaust stroke and/or the compression stroke. The forces applied to the crankshaft 92 by the pistons 82 in the expansion stroke may be in an opposite circumferential direction 72 to the forces applied to the crankshaft 92 during the ignition and expansion strokes. These forces may cause the crankshaft 92 to rotate in the circumferential direction 72, as to transmit torque to the transmission device 86. These forces may also cause the crankshaft 92 to twist in the circumferential direction 72 away from a neutral orientation of the crankshaft 92. Subsequently, the crankshaft 92 rebounds towards the neutral orientation.

The variations in the magnitude and the position in the axial direction 70 of the forces applied to the crankshaft 92 during reciprocating engine 80 operation may induce vibrations into the crankshaft 92. Such vibrations may increase the wear rate of bearings (not shown) that support the crankshaft 92 at positions in the axial direction 70. The vibrations may also induce mechanical stress into the crankshaft 92, which may decrease the usable life of the crankshaft 92. Further, the vibrations may modify the position of the pistons 82 relative to the timing drive 94, which regulates operation of components that control the timing of ignition in the reciprocating engine 80. The resultant modification of the timing of ignition relative to the position of the pistons 82 may decrease power output of the reciprocating engine 80.

To mitigate these vibrations, a damper 100 is coupled to the crankshaft 92. The damper 100 absorbs the vibrations associated with the variations in mechanical forces applied to the crankshaft 92. Some portions of the damper 100 maintain a clocking orientation with the crankshaft 92 of the reciprocating engine 80, while other portions of the damper 100 are permitted to vary in clocking orientation relative to the crankshaft 92. The variation in clocking orientation of the portions of the damper 100 may absorb vibrations induced to the crankshaft 92. In some embodiments, the inertia of the damper 100 may modify a resonant frequency of the crankshaft 92, such that the resonant frequency of the crankshaft 92 is not within the operating speed range of the reciprocating engine 80. In some embodiments, vibrations of the crankshaft 92 are damped by the damper 100 by dissipating the mechanical vibratory energy.

Figure 2:
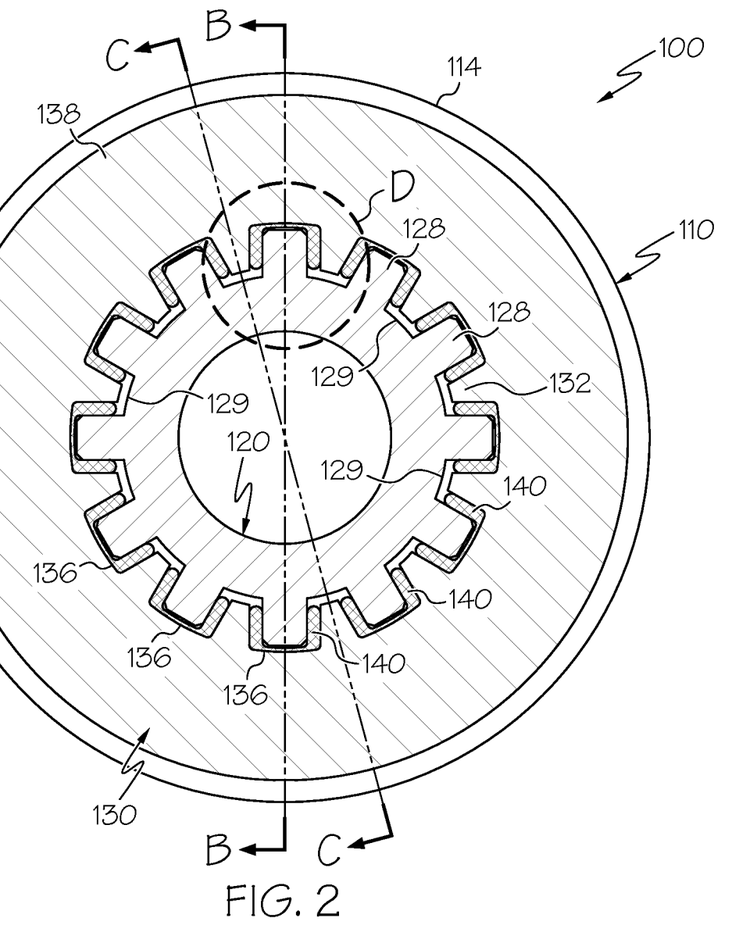
FIG. 2 schematically depicts a front sectional view of a damper for a crankshaft shown along line A-A of FIG. 1 according to one or more embodiments shown or described herein.
Figure 3:
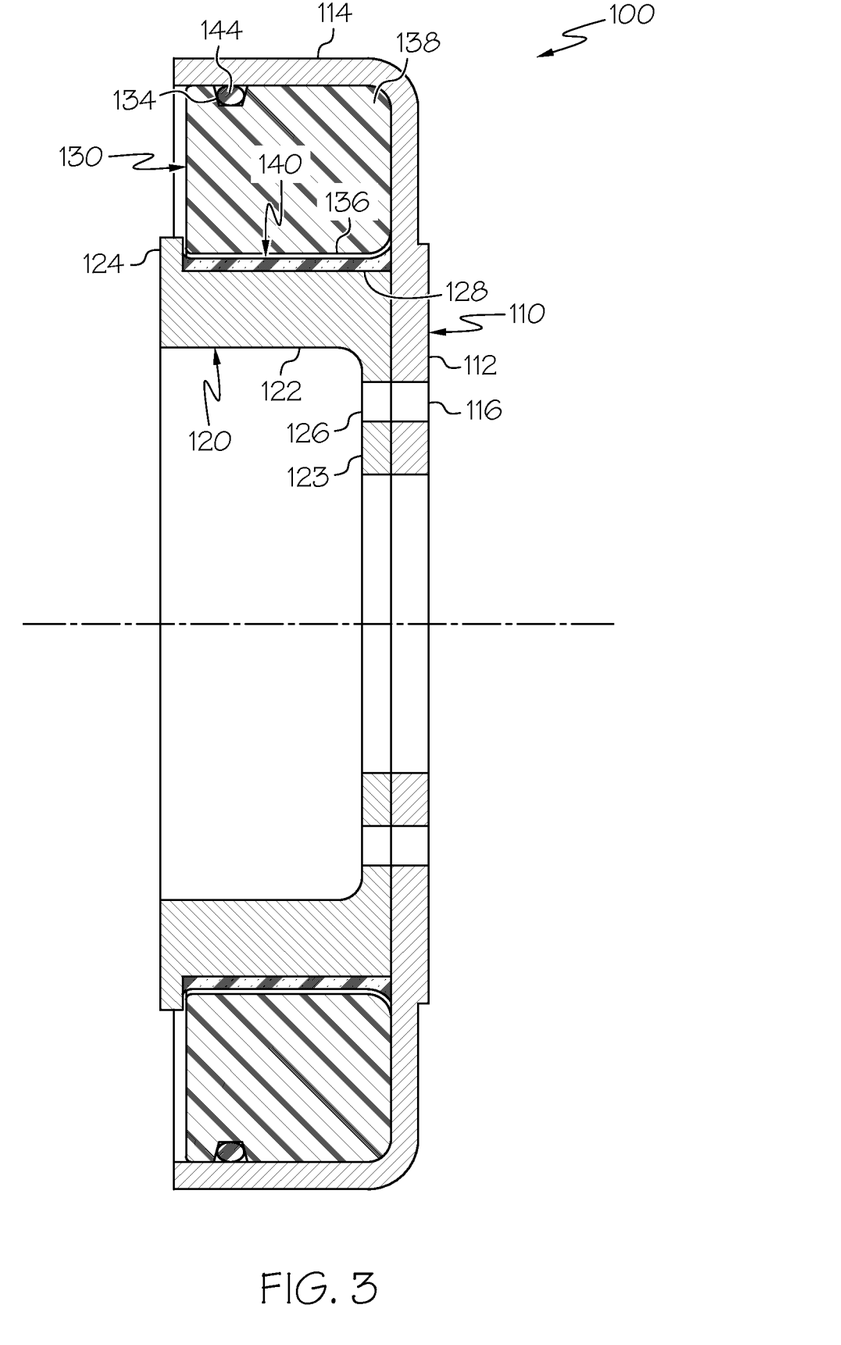
FIG. 3 schematically depicts a side sectional view of the damper for a crankshaft along line B-B of FIG. 2 according to one or more embodiments shown or described herein.
Figure 4:
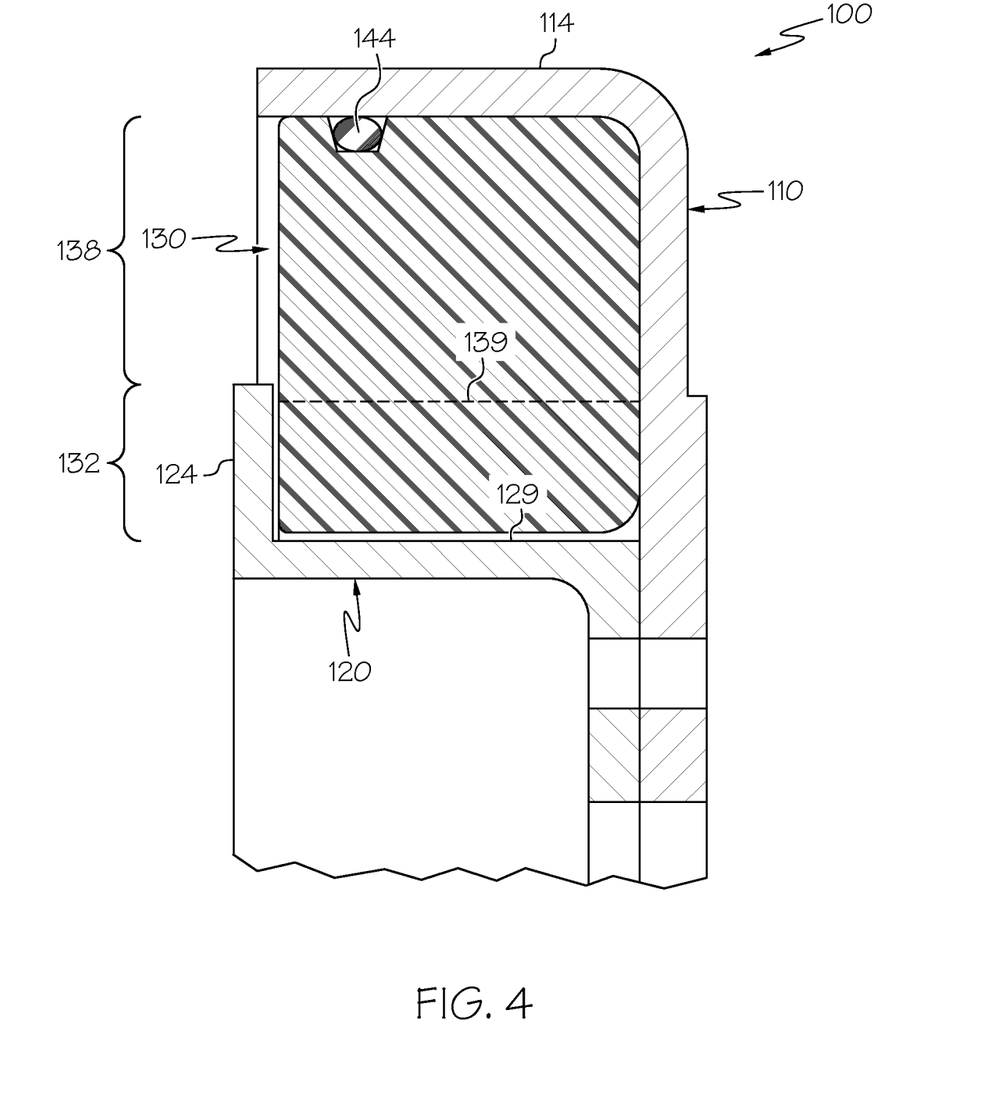
FIG. 4 schematically depicts a side sectional view of damper for a crankshaft along line C-C of FIG. 2 according to one or more embodiments shown or described herein.

Referring now to FIGS. 2-6, one embodiment of the damper 100 is depicted. In this embodiment, the damper 100 includes an inner shell 120, an outer shell 110, an inertia ring 130, and a plurality of damping pads 140. As depicted in FIG. 2, the inner shell 120 has a body portion 122 that includes a hub portion 129 and a plurality of teeth 128 that extend in the circumferential direction from the hub portion 129 around the body portion 122. In the embodiment depicted in FIGS. 2-6, the teeth 128 are parallel key splines in which sides of the teeth 128 are parallel to one another, and are generally parallel with a centerline of an individual tooth 128 extending in the radial direction. FIG. 3 is a sectional view of the damper 100 that is centered on a tooth 128 of the inner shell 120; FIG. 4 is a section view of the damper 100 that is centered between the teeth of the inner shell 120. Other shapes of the teeth 128, including involute and serrated splines, may be incorporated into the damper 100 without departing from the scope of the present disclosure.

As further depicted in FIG. 3, the inner shell 120 also includes a mounting flange portion 123 extending radially inward from the body portion 122. The mounting flange portion 123 includes a plurality of fastener openings 126 through which fasteners may be inserted to couple the inner shell 120 to the crankshaft 92, as depicted in FIG. 1.

Referring again to FIG. 3, the inner shell 120 further includes a capture lip 124 that extends radially outward from the top surface of the teeth 128. As shown in FIG. 3, the capture lip 124 extends from the body portion 122 of the inner shell 120 in a circumferential direction around an end face of the body portion 122. The capture lip 124 limits translation of the inertia ring 130 in the axial direction 70 away from the crankshaft 92 (depicted in FIG. 1).

Referring to FIG. 2-4, the damper 100 also includes an inertia ring 130 having an engagement portion 132 and an inertial portion 138. The engagement portion 132 includes a plurality of grooves 136 extending in the radial direction. The plurality of grooves 136 extend to a groove valley 139 in the inertia ring 130. In the depicted embodiment, the number of grooves 136 in the inertia ring 130 corresponds to the number of teeth 128 in the inner shell 120. When the damper 100 is assembled, the inner shell 120 is positioned proximate to the inertia ring 130 such that the grooves 136 of the inertia ring 130 at least partially surround the teeth 128 of the inner shell 120. The teeth 128 of the inner shell 120 and the grooves 136 of the inertia ring 130 are thereby intermeshed with one another.

Embodiments of the damper 100 according to the present disclosure may also include an outer shell 110. The outer shell 110 extends around at least a portion of the inertia ring 130 in the circumferential direction. As shown in FIG. 3, the outer shell 110 extends around at least a portion of the inertia ring 130 in the circumferential direction such that the outer shell 110 at least partially encapsulates the inertia ring 130. As depicted in FIG. 3, the outer shell 110 includes a flange portion 112 that extends in a generally radial orientation and a can portion 114 that extends from the flange portion 112 in a generally axial orientation. The flange portion 112 includes a plurality of fastener openings 116 through which fasteners may be inserted to couple the outer shell 110 and the inner shell 120 to the crankshaft. The can portion 114 of the outer shell 110 may surround all of the inertia ring 130 in the circumferential direction over the length of the inertia ring 130 in the axial direction. The outer shell 110 may serve as a scatter shield to ensure containment of damper components in the event of failure of one or more damper components. The outer shell 110 may also limit translation of the inertia ring 130 relative to the inner shell 120 in the radial direction 74, as will be discussed further below.

A series of timing indications (not shown) may be positioned along the outer diameter of the can portion 114 of the outer shell 110. When the damper 100 is mounted on the crankshaft 92, the timing indications are fixed in position relative to the crankshaft 92, and provide an indication of the crankshaft rotational orientation. Reliable reference of the rotational location of the crankshaft 92 may be beneficial for technicians manufacturing or adjusting the reciprocating engine 80.

The inner shell 120, the inertia ring 130, and the outer shell 110 may be manufactured from a variety of materials including, for example and without limitation, iron or ferrous alloys, aluminum or aluminum alloys, nickel or nickel alloys, lead or lead alloys, tungsten or tungsten alloys, and uranium or uranium alloys. In some embodiments, the inner shell 120, the inertia ring 130, and the outer shell may be manufactured from polymer or polymer reinforced composite, for example, nylon, polyester, epoxy, or polycarbonate, which may include glass, carbon, or metallic particles which increase the strength of the polymer.

The mass and geometric shape of the inertia ring 130 define a polar moment of inertia of the inertia ring 130 as evaluated in circumferential direction 72 of the crankshaft 92 rotating about the axis of rotation of the crankshaft 92 (see FIG. 1). Similarly, the mass and geometric shape of the inner shell 120 and the outer shell 110 may define a polar moment of inertia of the inner shell 120 and the outer shell 110, respectively. The respective polar moments of inertia of the inertia ring 130 and the inner shell 120 may be selected to suit particular parameters of an engine design, including the engine's cylinder configuration, crankshaft stiffness, polar moment of inertia, and mass, the crankshaft assembly polar moment of inertia and mass, combustion chamber pressure change rate, and the like. Because of the variety of variables that affect selection of mass and polar moment of inertia of the inner shell 120 and the inertia ring 130, mechanical design of the inner shell 120 and the inertia ring 130 may vary without departing from the scope of the present disclosure. In the embodiments described herein, the polar moment of inertia of the inertia ring 130 is greater than the polar moment of inertia of the inner shell 120. In embodiments of the damper 100, the polar moment of inertia of the inertia ring 130 may be at least three times the polar moment of inertia of the inner shell 120. In the embodiment depicted in FIGS. 2-6, the polar moment of inertia of the inertia ring is approximately 4.8 to 6 times the polar moment of inertia of the inner shell 120. In some embodiments, the polar moment of inertia of the inertia ring 130 is greater than about 10% of the polar moment of inertia of the crankshaft 92, for example, about 22% of the polar moment of inertia of the crankshaft 92. In some embodiments, the polar moment of inertia of the inertia ring 130 is greater than about 8% of the polar moment of inertia of the crankshaft assembly 90, for example, about 11% of the polar moment of inertia of the crankshaft assembly 90.

The mass and polar moment of inertia of the damper 100 may also modify the fundamental and harmonic vibratory frequencies of the crankshaft assembly 90. By increasing the mass of the crankshaft assembly 90, the damper 100 may change the fundamental and natural excitation frequencies of the crankshaft 92 itself. In some embodiments, the fundamental and/or the harmonic vibratory frequencies may be shifted away from the rotational operating speeds of the reciprocating engine 80, thereby mitigating any detrimental effects of the frequencies. Specifically, shifting the fundamental and/or natural excitation frequencies of the crankshaft 92 may allow for the reduction of excitation stresses at the natural excitation frequencies of the crankshaft 92, thereby reducing the likelihood of high-cycle fatigue of the crankshaft 92 within the operating speed envelope of the reciprocating engine 80.

Figure 5:
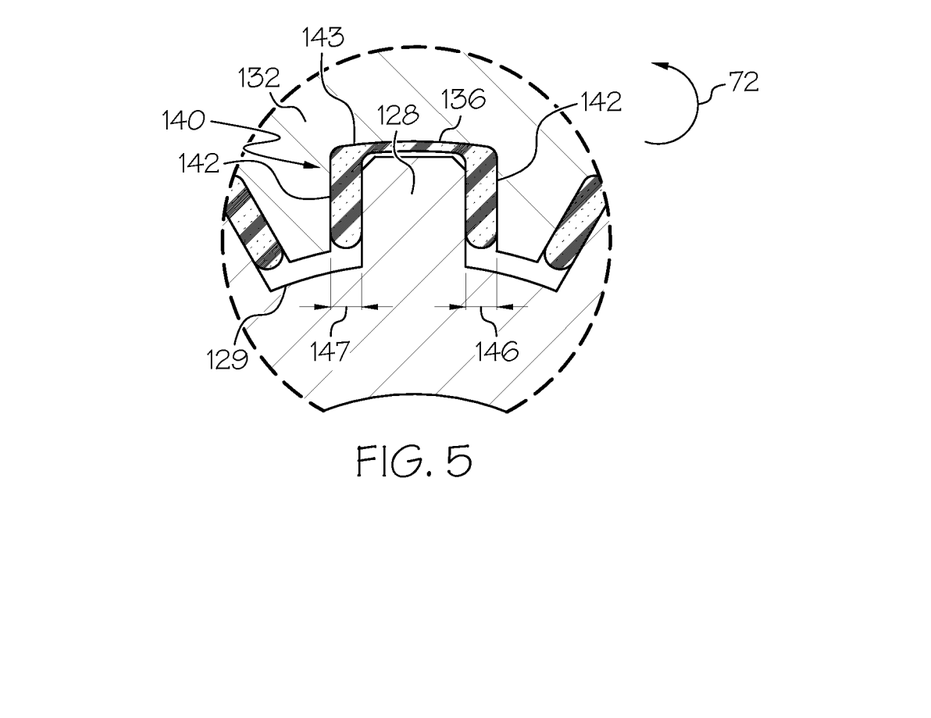
FIG. 5 schematically depicts a detailed front sectional view of the damper for a crankshaft shown at location D of FIG. 2.

Referring to FIGS. 2 and 5, the damper 100 further includes a plurality of damping pads 140 positioned within gaps between the grooves 136 of the inertia ring 130 and the teeth 128 of the inner shell 120. As depicted in FIG. 5, the damping pads 140 may include contact portions 142 that are positioned proximate to faces of the grooves 136 and the teeth 128 that are opposed from one another in the circumferential direction 72. The damping pads 140 may also include bridge portions 143 that connect adjacent contact portions 142. The damping pads 140, together with the intermeshed teeth 128 of the inner shell 120 and the grooves 136 of the inertia ring 130, limit radial translation of the inertia ring 130 relative to the inner shell 120, while allowing rotation of the inertia ring 130 relative to the inner shell 120 over a constrained range in the circumferential direction. In some embodiments, the damping pads 140 allow rotation of the inertia ring 130 relative to the inner shell 120 in a constrained range from about 5° degrees clockwise to about 5° anticlockwise of a neutral orientation. In other embodiments, the damping pads 140 allow rotation of the inertia ring 130 relative to the inner shell 120 in a constrained range from about 3° degrees clockwise to about 3° anticlockwise of the neutral orientation. In yet other embodiments, the damping pads 140 allow rotation of the inertia ring 130 relative to the inner shell 120 in a constrained range from about 2° degrees clockwise to about 2° anticlockwise of the neutral orientation.

The damping pads 140 may be made from a compliant material that undergoes elastic deformation under an applied load compared to the materials of the inertia ring 130 and the inner shell 120. Examples of such materials include, for example and without limitation, natural or synthetic elastomeric materials including silicone, fluoropolymer elastomers, for example Viton®, nitrile rubbers, butyl rubbers, ethylene propylene rubbers, and the like. The damping pads 140 may be manufactured in an injection molding operation, for example in a co-molding injection molding operation, that laminates contact portions 142 of the damping pads 140 onto at least one of the grooves 136 of the inertia ring 130 or onto the teeth 128 of the inner shell 120. In the embodiment of the damper 100 depicted in FIGS. 2-6, and shown in greater detail in FIG. 5, the contact portions 142 of the damping pads 140 are co-molded onto the grooves 136 of the inertia ring 130. The bridge portions 143 of the damping pads 140 are co-molded to the groove valley 139 of the inertia ring 130. The bridge portions 143 are spaced apart from the teeth 128 of the inner shell 120 in the radial direction such that the teeth 128 contact the contact portions 142 of the damping pads 140 in the circumferential direction 72. In other embodiments, the damping pads 140 may be co-molded over the entirety of each of the teeth of the inner shell and/or over each of the grooves of the inertia ring (not shown).

Figure 7:
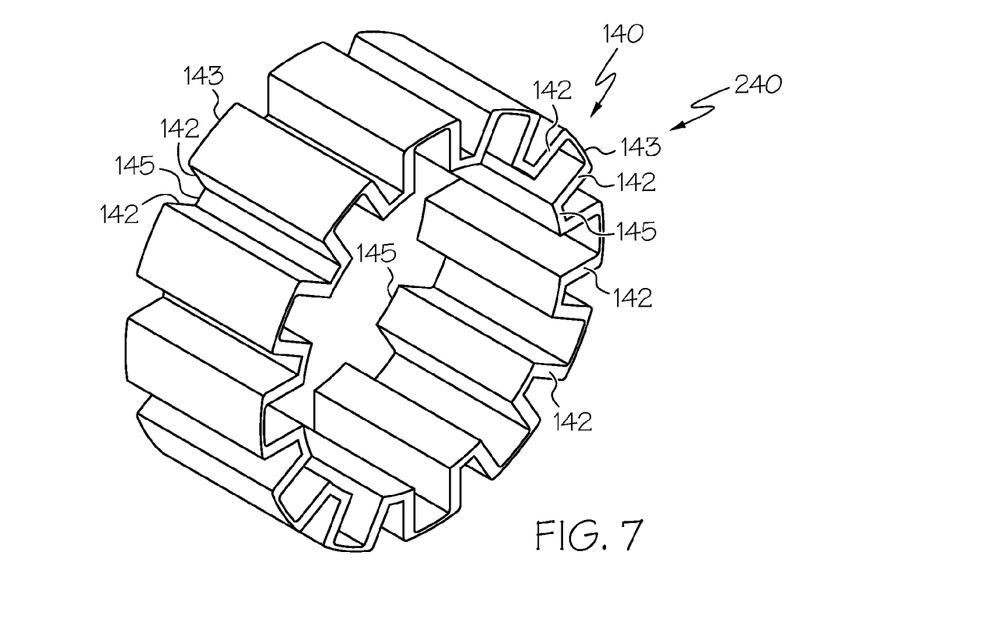
FIG. 7 schematically depicts a front perspective view of a collected damping insert for a damper according to one or more embodiments shown or described herein.

While the damping pads may be overmolded or co-molded onto the grooves of the inertia ring or the teeth of the inner shell, the damping pads may be formed as a separate, stand-alone component. By way of example, one embodiment of a collected damping insert 240 is depicted in FIG. 7. In this embodiment, a plurality of damping pads 140, each including contact portions 142 and bridge portions 143 of the damping pads 140, are coupled to an attachment ring 145. The attachment ring 145 interconnects the damping pads 140 such that the damping pads 140 are positioned for assembly between the teeth of the inner shell and grooves of the inertia ring. In such embodiments, all of the damping pads 140 and the attachment ring 145 that define the collected damping insert 240 may be formed in a single-stage injection molding process.

Figure 6:
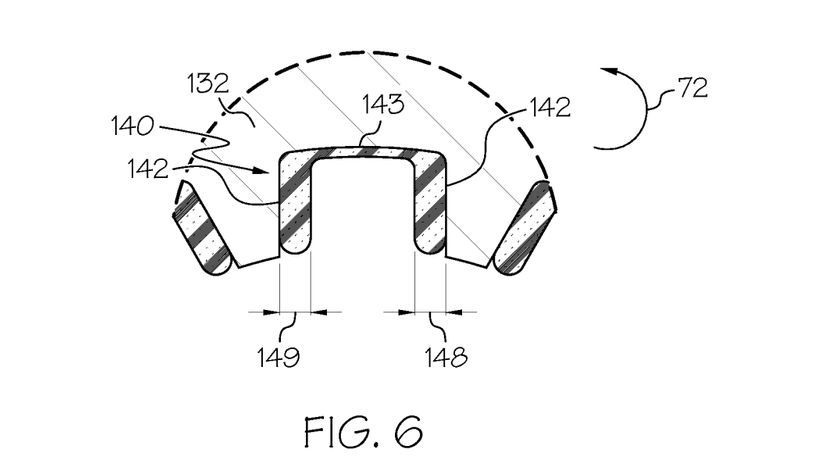
FIG. 6 schematically depicts a detailed front sectional view of the inertia ring of the damper for a crankshaft shown at location D of FIG. 2.

Referring to FIGS. 5 and 6, in some embodiments, the damping pads 140 may be manufactured such that the contact portions 142 are deformed from their unconstrained state when the inner shell 120 is assembled with the inertia ring 130. Specifically, the damping pads 140 may be sized such that inserting the teeth 128 of the inner shell 120 into the corresponding grooves 136 of the inertia ring 130 deform the contact portions 142 by squeezing the contact portions 142 between the teeth 128 and the grooves 136. Restated, the first and second thickness 148, 149 of the undeformed contact portions 142 (i.e., the damping pads 140 without the inner shell installed, as depicted in FIG. 6) are greater than the first and second thicknesses 146, 147 of the deformed contact portions 142 (i.e., the damping pads 140 with the inner shell 120 installed, as depicted in FIG. 5). Dimensional fit of the teeth 128, grooves 136, and the damping pads 140 that deform the damping pads 140 from their nominal shape upon assembly of the damper 100 maintains compression on the contact portions 142 of the damping pads 140 in the circumferential direction 72 across a wide range of operating parameters of the reciprocating engine.

Referring again to FIG. 5, in embodiments of the reciprocating engine 80, mechanical vibrations imparted to the crankshaft 92 tends to modify the clocking orientation of the inner shell 120 relative to the inertia ring 130. In general, the inertia ring 130 carries moment that resists acceleration. Vibrations of the crankshaft may accelerate the inner shell 120 relative to the inertia ring 130, which may modify the relative positioning of the inner shell 120 and the inertia ring 130.

The re-clocking of the inner shell 120 relative to the inertia ring 130 compresses the contact portions 142 of the damping pad 140 in the direction of rotation of the inner shell 120 relative to the inertia ring 130 and relaxes the contact portions 142 of the damping pads 140 in the direction opposite the rotation of the inner shell 120 relative to the inertia ring 130. Rotation of inner shell 120 in the anti-clockwise direction relative to the inertia ring 130 compresses contact portions 142 of the damping pads 140 positioned in the anti-clockwise direction (i.e., tends to decrease the spacing 147) and relaxes (or expands) contact portions of the damping pads 140 positioned in the clockwise direction (i.e., tends to increase the spacing 148).

Further, because the inertia ring 130 is free to rotate relative to the inner shell 120 in the circumferential direction 72 over a constrained range, each of the pairs of damping pads 140 positioned between the teeth 128 and the grooves 136 absorb mechanical force. All of the damping pads 140, therefore, absorb mechanical energy to distribute the loads associated with crankshaft vibration and acceleration across all of the teeth 128 and grooves 136 of the damper 100. By widely distributing the load across all of the teeth 128 and the grooves 136, and their associated damping pads 140, wear to individual damping pads 140 may be minimized and the service life of the damper 100 extended.

Compression and relaxation of the contact portions 142 of the damping pads 140 may absorb the mechanical vibrations from the inner shell 120 and dissipate the mechanical energy by converting the mechanical energy to heat. Conversion of the mechanical energy of the vibrations to heat reduces the vibratory energy returned to the crankshaft 92 as the contact portions 142 of the damping pads 140 return to their nominal shapes and sizes and the inner shell 120 rotates in a clockwise direction relative to the inertia ring 130. Conversion of mechanical energy to heat may be reflected as reduced spring-back of the contact portions 142 of the damping pads 140, which is related to mechanical properties of the material of which the damping pads 140 are constructed. Accordingly, materials having desired spring-back rates may be selected for use in the damping pads 140 based on the desired mechanical energy-to-heat conversion.

Referring again to FIG. 3, some embodiments of the inertia ring 130 may also include a gland 134 positioned proximate to the outer diameter of the inertia ring 130 and extending around the circumference of the inertia ring 130. The damper 100 may also include an o-ring 144 that is positioned within the gland 134. While the depicted embodiment of the damper 100 includes a single gland 134 and o-ring 144, it should be understood that other embodiments of the damper may include a plurality of glands and o-rings without departing from the scope of the present disclosure. When the inertia ring 130 is assembled into the outer shell 110, the can portion 114 of the outer shell 110 compresses the o-ring 144, inducing a gripping force between the gland 134 of the inertia ring 130 and the can portion 114 of the outer shell 110. The gripping force is induced by the squeeze applied to the o-ring 144 and may be modified by changing the dimensional fit between the o-ring 144, the gland 134, and the can portion 114. The induced gripping force between the can portion 114 and the gland 134 across the o-ring 144 may increase a resistance to relative rotation between the inertia ring 130 and the outer shell 110 in the circumferential direction.

In these embodiments, the o-ring 144 provides additional or supplemental damping capabilities to the damping pads 140. The o-ring 144 positioned between the inertia ring 130 and the can portion 114 of the outer shell 110 dissipates mechanical energy from the damper 100 in association with the damping pads 140 positioned between the teeth 128 of the inner shell 120 and the grooves 136 of the inertia ring 130. Further, energy dissipation of the damping pads 140 and the o-ring 144 may be tuned, for example through selection of materials and/or selection of geometric fits between components, such that the total energy dissipation of the damper 100 may be achieved.

Relative rotation between the inertia ring 130 and the outer shell 110 may be resisted by the o-ring 144. As the mechanical forces rotating the inertia ring 130 relative to the outer shell 110 overcome the gripping force applied by the o-ring 144, the o-ring 144 tends to slip relative to at least one of the gland 134 or the can portion 114. Slip between the o-ring 144 and the gland 134 and/or the can portion 114 may generate heat, thereby reducing the mechanical energy applied to the damper 100. Therefore, the o-ring 144 may dissipate mechanical energy introduced to the damper 100, and prevent that mechanical energy from being reintroduced to the crankshaft of the reciprocating engine and inducing vibrations to the crankshaft assembly.

Figure 8:
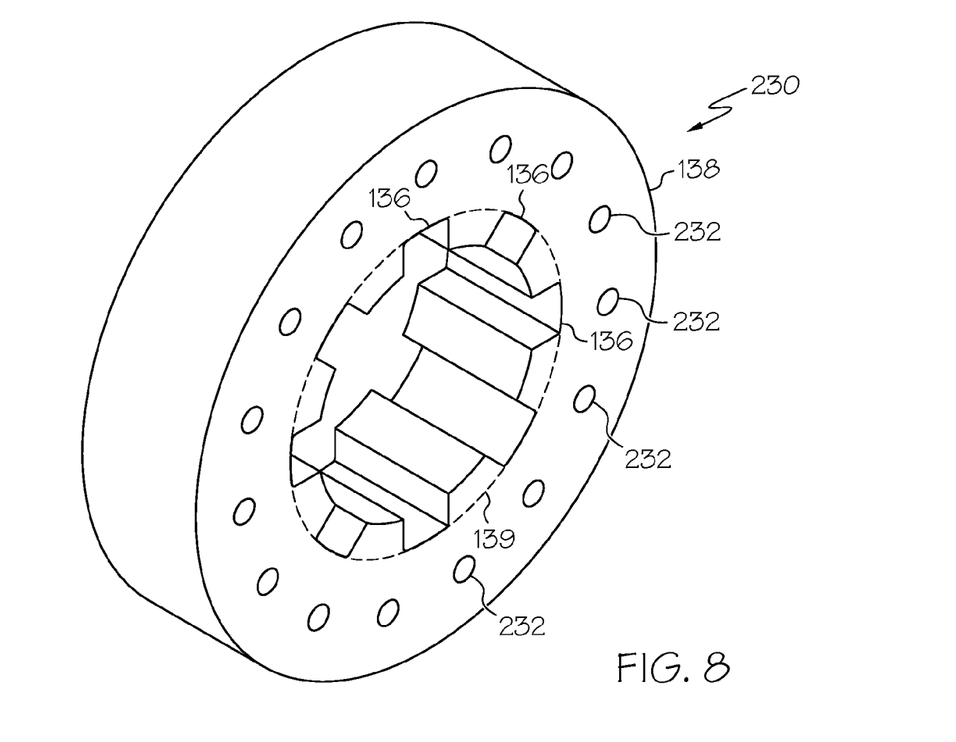
FIG. 8 schematically depicts a front perspective view of a damper for a crankshaft according to one or more embodiments shown or described herein.
Figure 9:
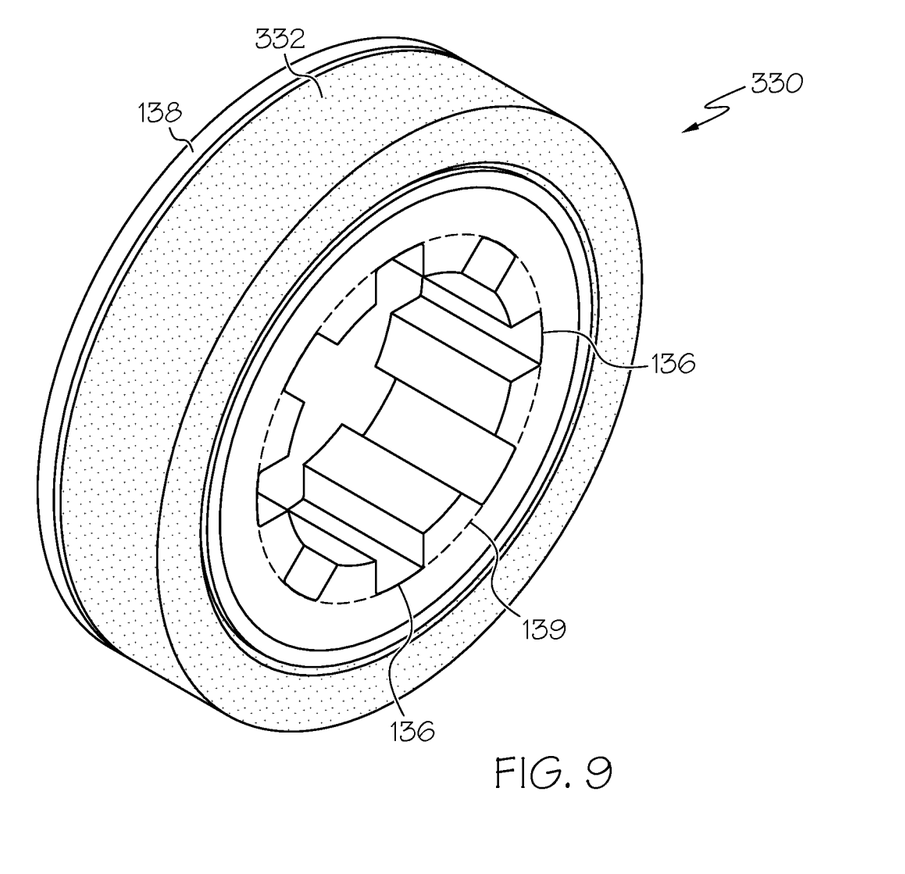
FIG. 9 schematically depicts a front perspective view of a damper for a crankshaft according to one or more embodiments shown or described herein.
Figure 10:
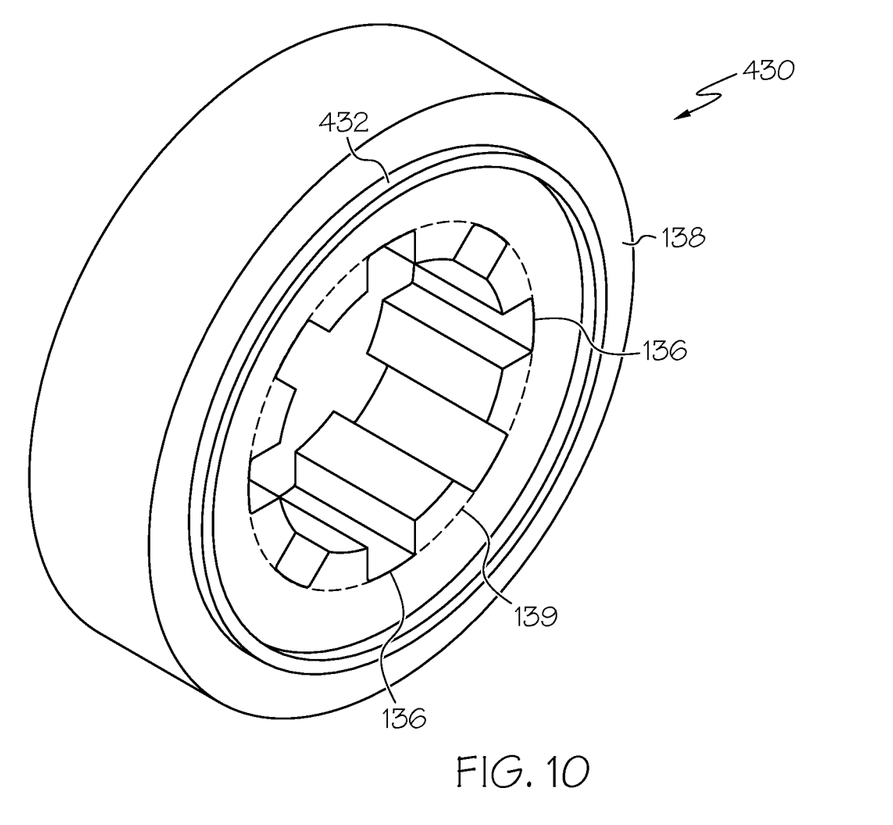
FIG. 10 schematically depicts a front perspective view of a damper for a crankshaft according to one or more embodiments shown or described herein.

Referring now to FIGS. 8-10, various embodiments of inertia rings 230, 330, 430 are depicted. Referring to FIG. 8, one embodiment of the inertia ring 230 may include a plurality of local ballast members 232 that are coupled to the inertial portion 138 of the inertia ring 230. In some embodiments, the density of the ballast members 232 may be greater than the density of the inertial portion 138 of the inertia ring 230, such that the mass and the polar moment of inertia of the inertia ring 230 is increased by inclusion of the ballast members 232. In other embodiments, the density of the ballast members 232 may be less than the density of the inertial portion 138 of the inertia ring 230, such that the mass and the polar moment of inertia of the inertia ring 230 is reduced by inclusion of the ballast members 232. Modifying the mass and the polar moment of inertia of the inertia ring 230 may modify the fundamental and/or harmonic vibratory frequencies of the crankshaft assembly.

In some embodiments, the ballast members 232 may include a threaded engagement that interfaces with the inertial portion 138 of the inertia ring 130. In other embodiments, the ballast members 232 may be adhered to the inertial portion 138 of the inertia ring. In yet other embodiments, the ballast members 232 may be coupled to the inertia ring through a welded or brazed interface.

Referring to FIG. 9, in some embodiments, the inertia ring 330 may include a bulk ballast member 332 coupled to the inertial portion 138 of the inertia ring 330. In this embodiment, the bulk ballast member 332 is an annular-shaped member that provides a majority of the polar moment of inertia of the inertia ring 330. In some embodiments, the density of the bulk ballast member 332 may be greater than the density of the inertial portion 138 of the inertia ring 330, such that the mass and the polar moment of inertia of the inertia ring 330 is increased by inclusion of the bulk ballast member 332. In other embodiments, the density of the bulk ballast member 332 may be less than the density of the inertial portion 138 of the inertia ring 330, such that the mass and the polar moment of inertia of the inertia ring 330 is reduced by inclusion of the bulk ballast member 332. In some embodiments, the bulk ballast member 332 may be coupled to the inertia ring 330 through an interference fit of adjacent diameters.

Referring now to FIG. 10, in another embodiment, the inertia ring 430 may include a balance member 432. The balance member 432 may be positioned proximate to the inertial portion 138 of the inertia ring 430. Portions of the balance member 432 may be selectively removed through a variety of material removal operations such that the balance of the inertia ring 430 may be neutralized. Tolerances associated with manufacturing the inertia ring 430, in particular tolerances associated with manufacturing operations that form the grooves 136 and the groove valleys 139, may tend to shift the balance of the inertia ring 430 away from a neutral axis. By removing portions of the balance member 432, neutral balance of the inertia ring 430 may be restored, such that rotation of the inertia ring 430 does not induce imbalance into the crankshaft of the reciprocating engine.

It should now be understood that dampers according to the present disclosure add mass to a crankshaft assembly of a reciprocating engine, which may modify the fundamental and harmonic vibratory frequencies of the crankshaft. Modification of the fundamental and harmonic vibratory frequencies may avoid a high-frequency interaction of the crankshaft within the engine operating speed range, which may increase crankshaft life. Further, the dampers include an inertia ring that is constrained from moving in the axial direction and the radial direction relative to the crankshaft, and allowed to rotate in the circumferential direction relative to the crankshaft by compressing a plurality of damping pads. The damper absorbs mechanical vibrations imparted to the crankshaft and dissipates the energy associated with the mechanical vibrations. The damping pads distribute the load across all of the intermeshed teeth and grooves of the damper to minimize wear to the damping pads, thereby increasing damper usable life.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A damper for a crankshaft comprising:
   an inner shell comprising a body portion, a capture lip extending from the body portion of the inner shell in a circumferential direction around an end face of the body portion, and a plurality of teeth extending in a radial direction from the body portion;
   an inertia ring comprising a plurality of grooves extending in the radial direction, the inertia ring positioned proximate to the inner shell such that grooves of the inertia ring intermesh the teeth of the inner shell; and
   a plurality of damping pads positioned between the teeth of the inner shell and the grooves of the inertia ring,
   wherein the inertia ring is constrained from translating in the axial direction and the radial direction with respect to the inner shell and is rotatable with respect to the inner shell in the circumferential direction through a constrained range by compressing the damping pads.

2. The damper of claim 1, further comprising an outer shell extending around at least a portion of the inertia ring in the circumferential direction such that the outer shell at least partially encapsulates the inertia ring.

3. The damper of claim 2, wherein one of the inertia ring or the outer shell comprises a gland extending in the circumferential direction, and the damper further comprises an o-ring positioned within the gland and contacting both the inertia ring and the outer shell.

4. The damper of claim 1, wherein the plurality of damping pads comprise an elastomeric material.

5. The damper of claim 1, wherein the plurality of damping pads are coupled to one of the teeth of the inner shell or the grooves of the inertia ring.

6. The damper of claim 1, wherein the damping pads are coupled to an attachment ring of a collected damping insert.

7. The damper of claim 1, wherein the inertia ring comprises a polar moment of inertia in the circumferential direction that is at least three times a polar moment of inertia of the inner shell.

8. The damper of claim 1, wherein the inertia ring further comprises an inertial portion positioned radially outward from the grooves.

9. The damper of claim 8, wherein the inertia ring further comprises at least one ballast member coupled to the inertial portion.

10. The damper of claim 9, wherein the at least one ballast member has a density different than a density of the inertial portion.

11. The damper of claim 9, wherein the at least one ballast member is selected from the group consisting of iron or a ferrous alloy, lead or a lead alloy, nickel or a nickel alloy, and tungsten or a tungsten alloy.

12. The damper of claim 1, wherein the inertia ring further comprises a balance member.

13. The damper of claim 1, wherein the damping pads are deformed from their unconstrained state when positioned between the teeth of the inner shell and the grooves of the inertia ring.

14. A damper for a crankshaft comprising:
    an inner shell comprising a body portion, a capture lip extending from the body portion of the inner shell in a circumferential direction around an end face of the body portion, and a plurality of teeth extending in a radial direction from the body portion;
    an inertia ring comprising a plurality of grooves extending in the radial direction, wherein the inertia ring is positioned proximate to the inner shell such that grooves of the inertia ring intermesh the teeth of the inner shell;
    a plurality of damping pads positioned between the teeth of the inner shell and the grooves of the inertia ring; and
    an outer shell extending around at least a portion of the inertia ring in the circumferential direction,
    wherein the inertia ring is constrained from translating in the axial direction and the radial direction with respect to the inner shell and is rotatable with respect to the inner shell in the circumferential direction through a constrained range by compressing the damping pads.

15. The damper of claim 14, wherein the plurality of damping pads comprise an elastomeric material.

16. The damper of claim 14, wherein the constrained range is within about 2° of nominal.

17. The damper of claim 14, wherein the inertia ring further comprises an inertial portion positioned radially outwards from the grooves and the inertia ring further comprises at least one ballast member coupled to the inertial portion.

18. A reciprocating engine comprising:
    a crankshaft assembly comprising:
      a plurality of pistons adapted to reciprocate in a radial direction;
      a crankshaft adapted to rotate in a circumferential direction;
      a plurality of connecting rods coupling one of the plurality of pistons to the crankshaft; and
      a damper coupled to the crankshaft, the damper comprising:
        an inner shell comprising a body portion, a capture lip extending from the body portion of the inner shell in the circumferential direction around an end face of the body portion, and a plurality of teeth extending in the radial direction from the body portion;

an inertia ring comprising a plurality of grooves extending in the radial direction, wherein the inertia ring is positioned proximate to the inner shell such that grooves of the inertia ring intermesh the teeth of the inner shell;

a plurality of damping pads positioned between the teeth of the inner shell and the grooves of the inertia ring; and an outer shell extending around at least a portion of the inertia ring in the circumferential direction, wherein the inertia ring is constrained from translating in the axial direction and the radial direction with respect to the inner shell and is rotatable with respect to the inner shell in the circumferential direction through a constrained range by compressing the damping pads.

19. The reciprocating engine of claim 18, wherein the plurality of damping pads comprise an elastomeric material.

20. The reciprocating engine of claim 18, wherein the damping pads are deformed from their unconstrained state when positioned between the teeth of the inner shell and the grooves of the inertia ring.

* * * * *